May 24, 1955  W. H. HAUPT ET AL  2,709,221
X-RAY APPARATUS
Filed Sept. 19, 1952  6 Sheets-Sheet 1
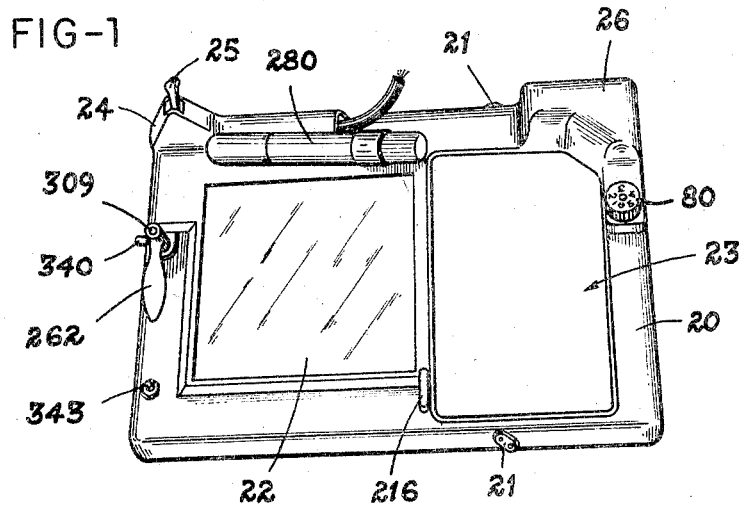
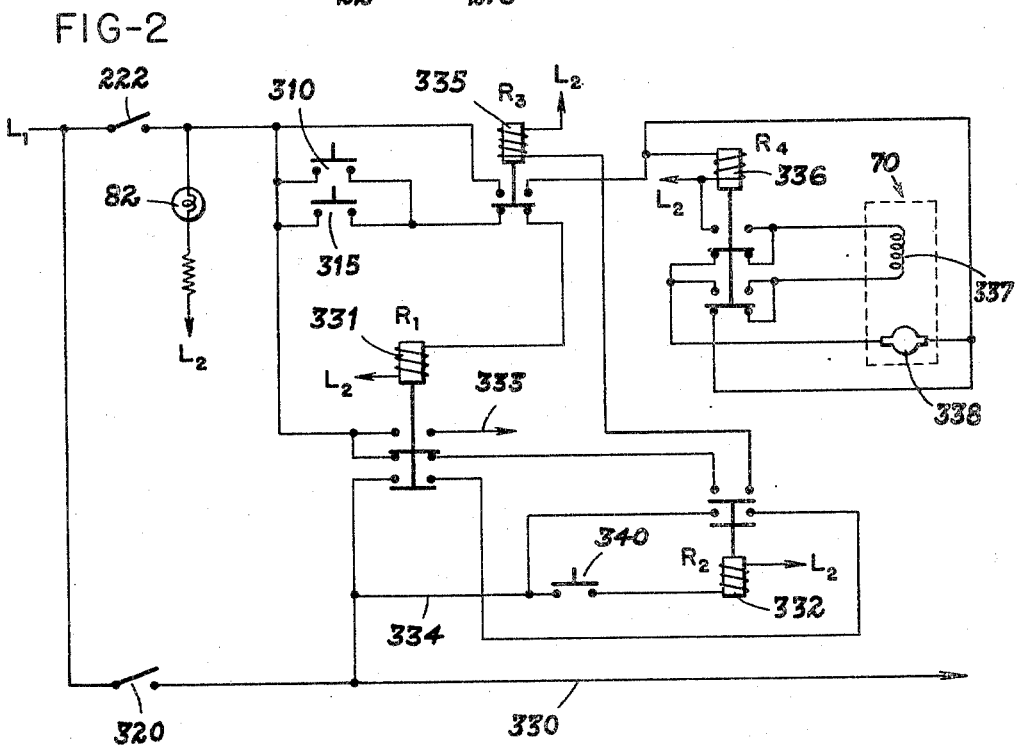
INVENTORS
WALTER H. HAUPT &
PAUL F. SCHEPKER
BY *Marechal Biebel French & Bugg*
ATTORNEYS

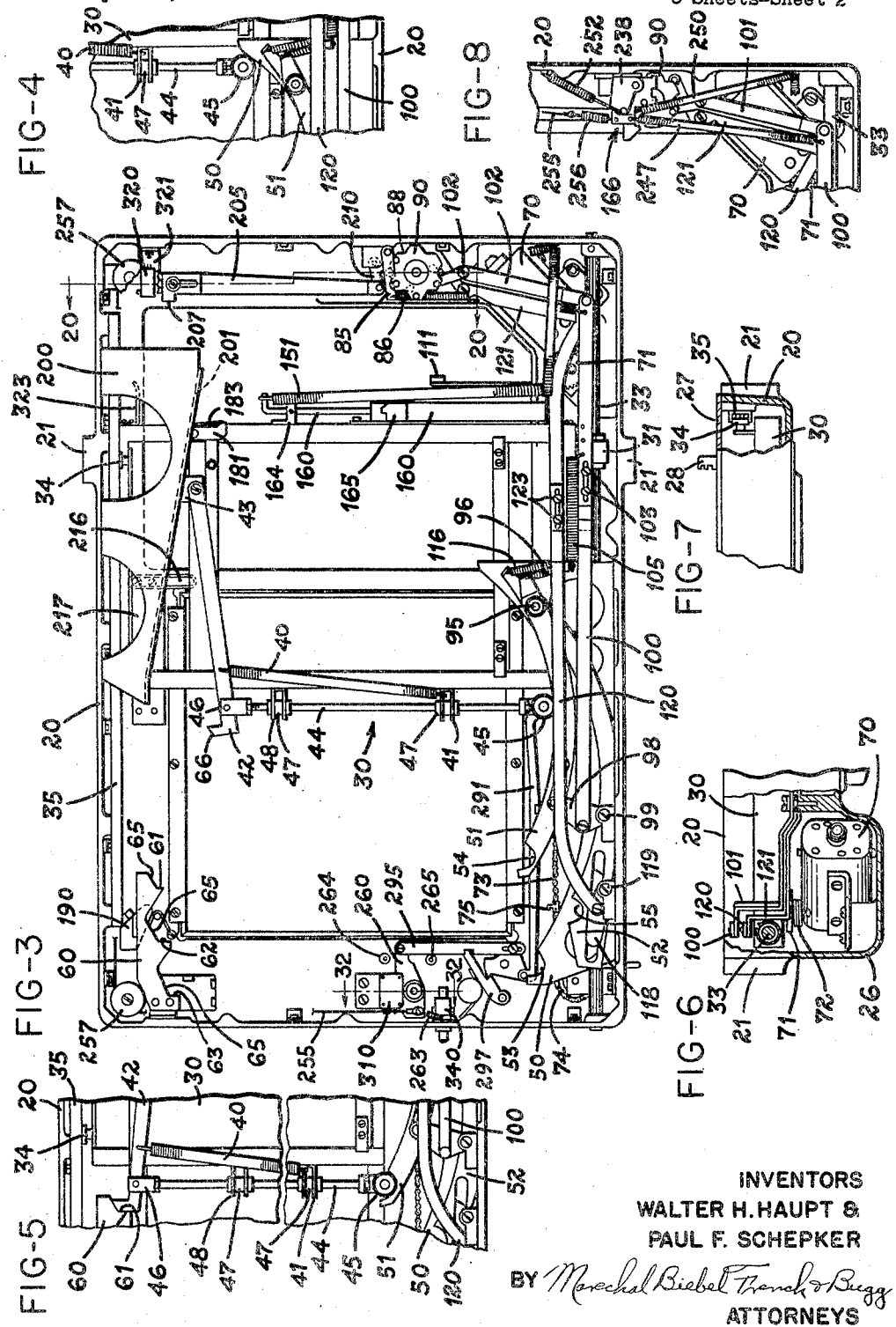

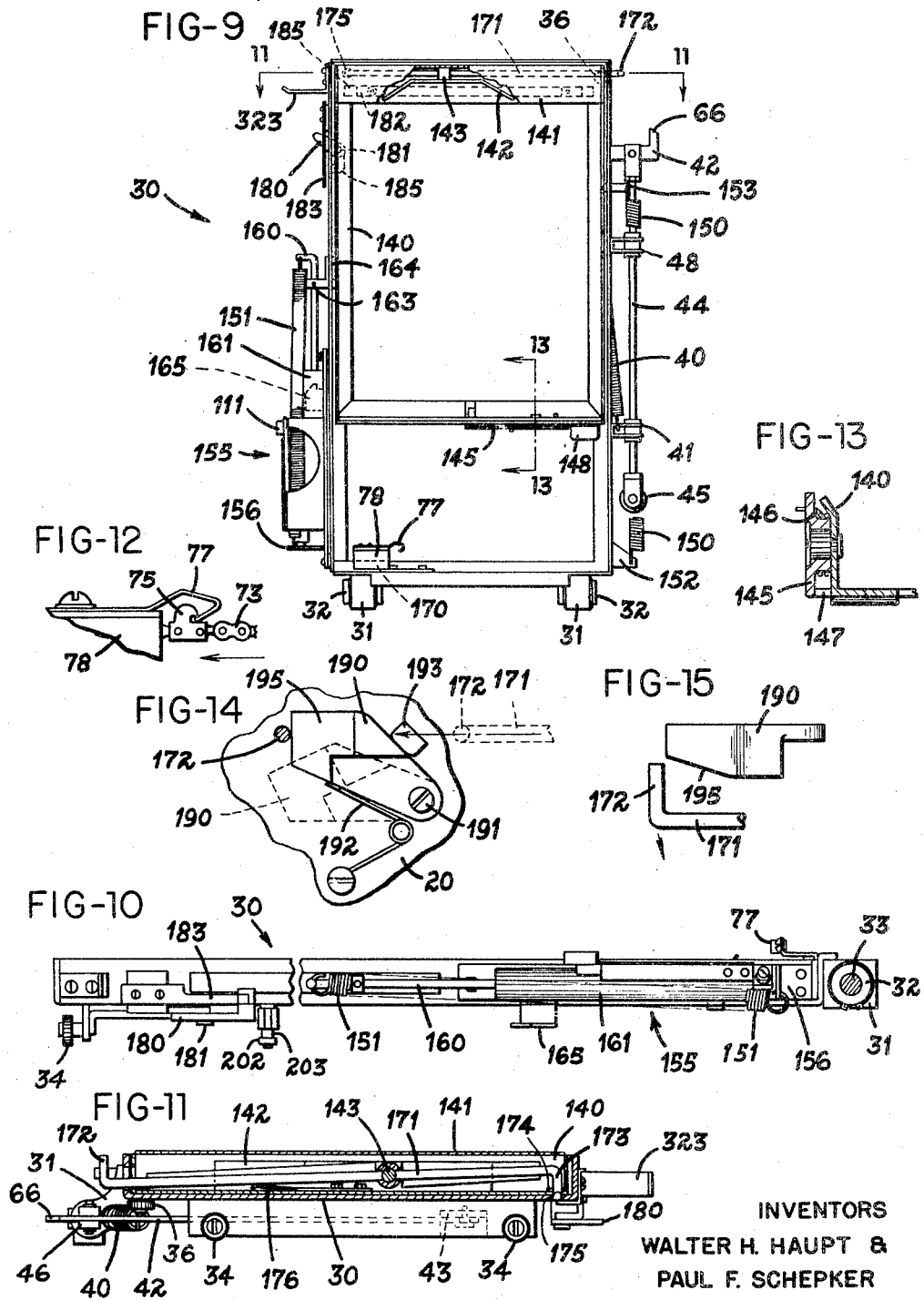

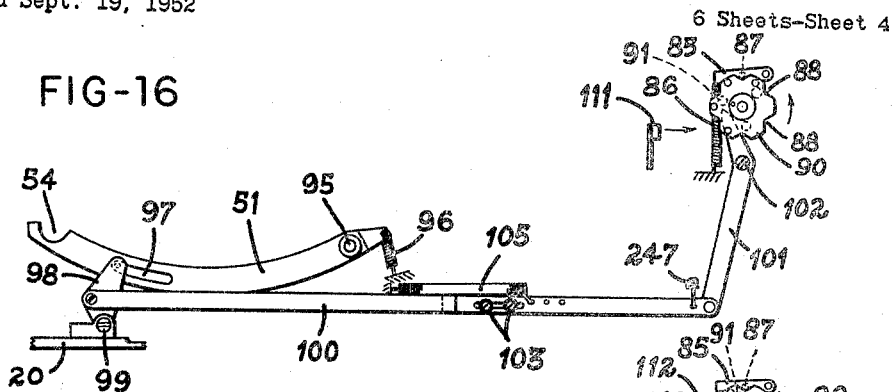
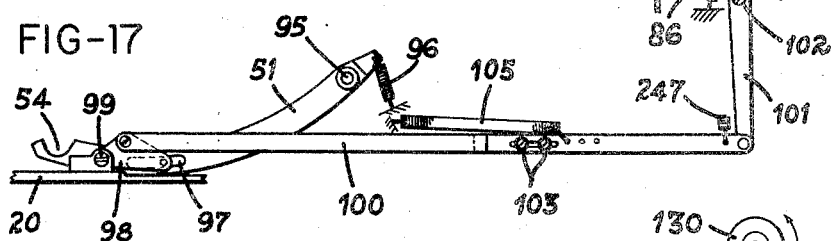
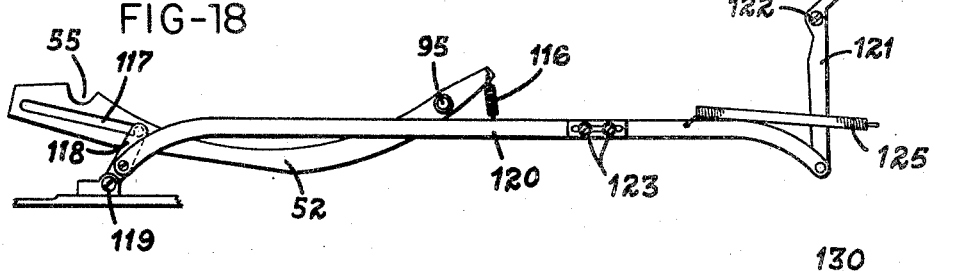
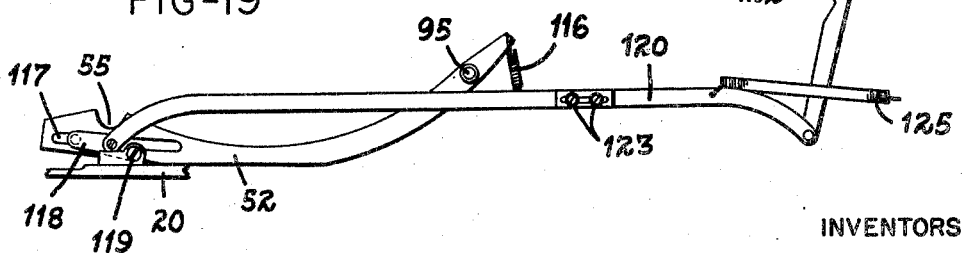

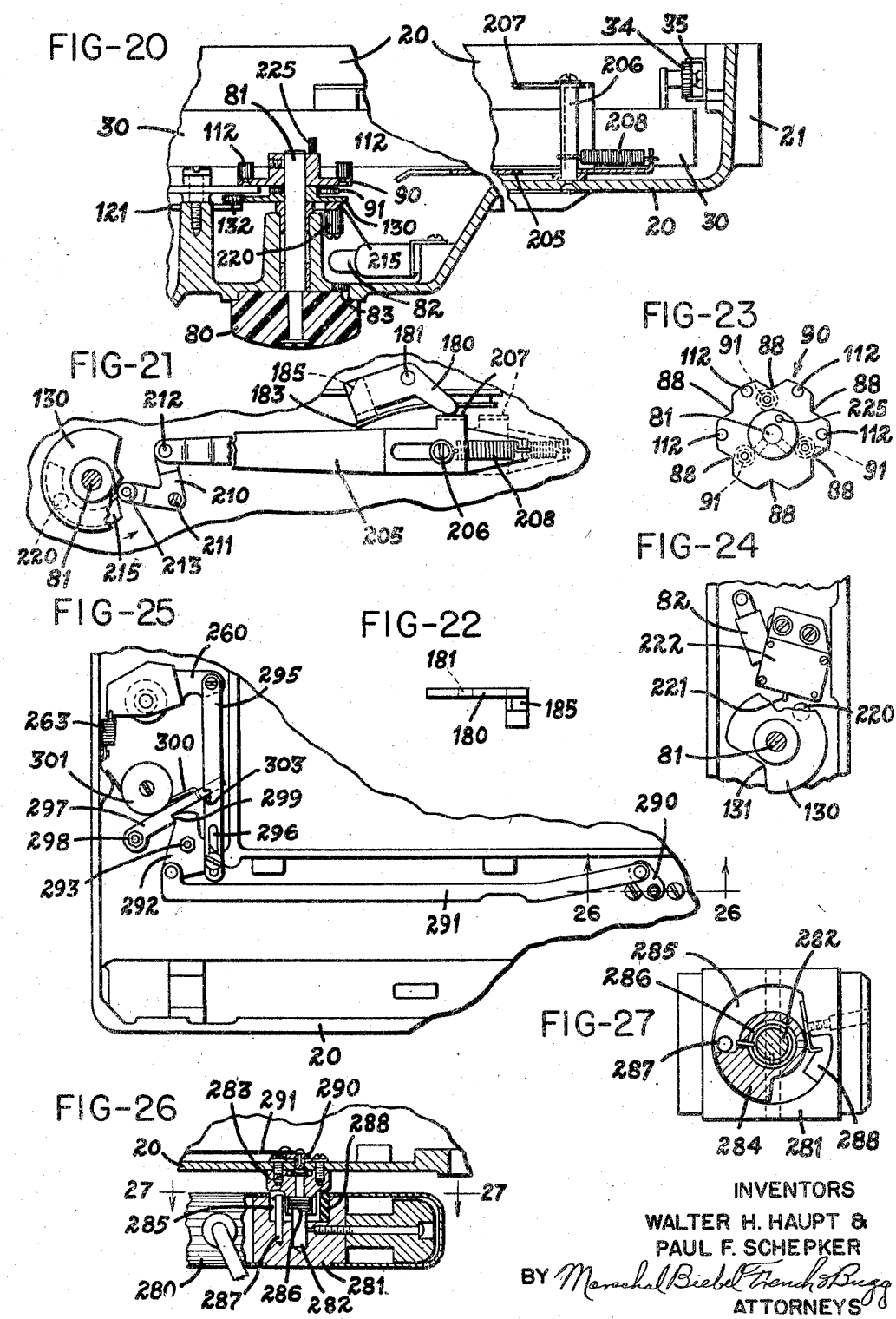

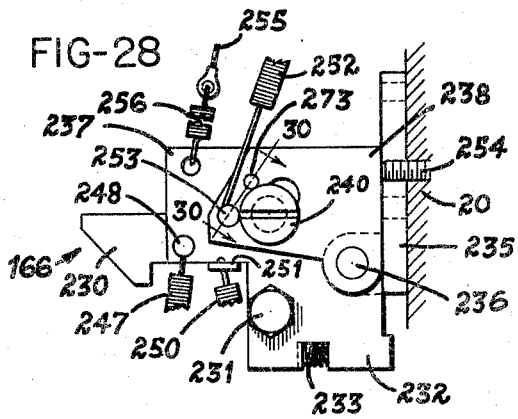
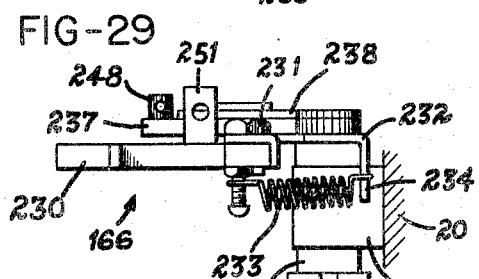
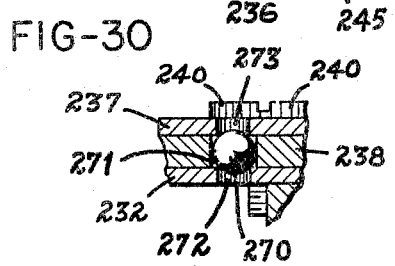
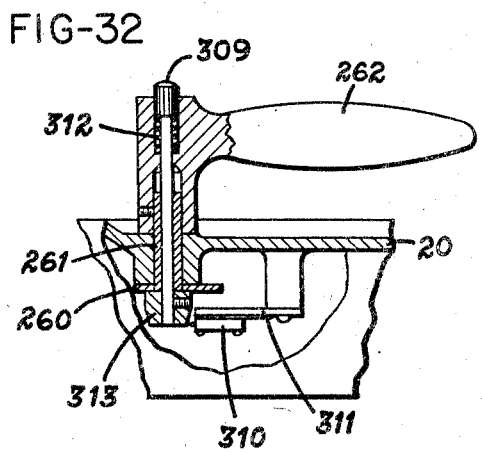
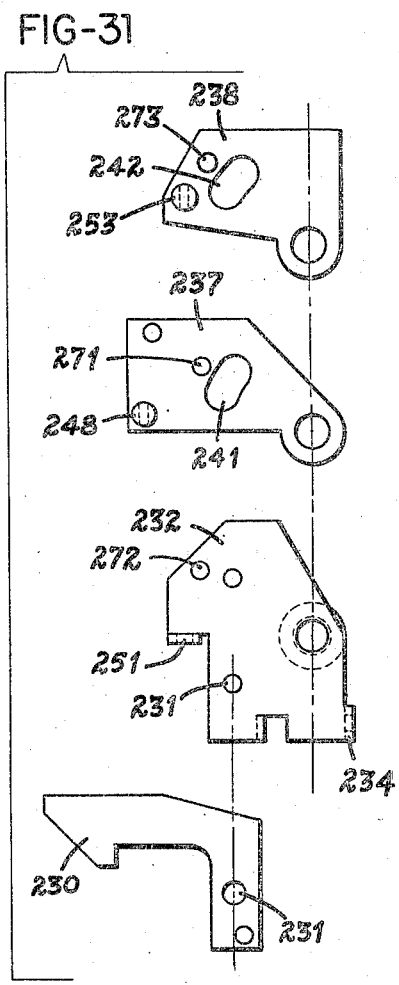

United States Patent Office 2,709,221
Patented May 24, 1955

2,709,221

X-RAY APPARATUS

Walter H. Haupt, Kenton Hills, and Paul F. Schepker, South Fort Mitchell, Ky., assignors to Keleket X-Ray Corporation, Covington, Ky., a corporation of Ohio Application September 19, 1952, Serial No. 310,524

6 Claims. (Cl. 250—66)

This invention relates to a spot film tunnel for X-ray examination purposes.

A spot film tunnel is a device adapted to be employed in conjunction with an X-ray tube, and usually with an X-ray examination table, which includes both a fluorescent screen for use during fluoroscopy and a carriage holding a cassette or other support for X-ray sensitive material, and the carriage is mounted within the tunnel for movement between a retracted position out of the path of the X-ray beam and an advanced position in line with the fluorescent screen. The doctor or other operator is accordingly able to carry on fluoroscopic examination of the patient, and when he detects a condition which he wishes to radiograph, he causes the carriage to advance into its exposure position and takes the desired picture.

One of the principal objects of the present invention is to provide a spot film tunnel in which movement of the carriage between its retracted or advanced or exposure position is effected under controlled conditions causing the carriage to reach its exposure position so quickly and also so smoothly that taking of the radiograph can be started within a fraction of a second after the carriage is first released from its retracted position.

Another object of the invention is to provide a spot film tunnel in which the carriage for the cassette or other X-ray sensitive unit is caused to advance from its retracted position to its exposure position with an essentially harmonic motion causing it to arrive at the exposure position rapidly but at decelerating speed such that shock and vibration are effectively eliminated and the exposure can be started substantially instantaneously after arrival of the carriage at its exposure position.

An additional object of the invention is to provide a spot film tunnel in which reciprocation of the carriage within the tunnel body is effected by power operation in both directions under the control of the operator, and more particularly to provide a tunnel in which advancing movement of the carriage is effected by a spring drive and the retracting movement of the carriage is effected by an electric motor drive.

It is also an object of the invention to provide a spot film tunnel as outlined above which is adapted for use with a cassette holding an X-ray film or plate, which is capable at the option of the operator of taking either four pictures each covering a quarter of the cassette, two pictures each covering half of the cassette or a single picture covering the entire cassette, and in which when the tunnel is utilized to take either two or four pictures, the cassette is shifted between exposure to align the center of the area to be exposed with the center of the X-ray beam and the shifting of the movable parts to locate the proper portions of the cassette in exposure position is effected automatically until the entire cassette has been exposed and thereafter the device locks to prevent accidental double exposure.

Other objects and advantages of the present invention will be apparent from the following description, the accompanying drawings and the appended claims.

In the drawings—

Fig. 1 is a perspective view showing a spot film tunnel constructed in accordance with the invention;

Fig. 2 is a wiring diagram;

Fig. 3 is a view of the underside of the tunnel with the bottom plate removed, showing the carriage in an intermediate position and also with the latch mechanism removed to show the indexing assembly more clearly;

Fig. 4 is a fragmentary view of Fig. 3 showing a portion of the carriage in its retracted position;

Fig. 5 is a view similar to Fig. 4 showing the same portion of the carriage in its fully advanced position;

Fig. 6 is a fragmentary view looking from right to left in Fig. 3 and with portions broken away to show the drive motor for the carraige;

Fig. 7 is a view similar to Fig. 6 of the opposite corner of the tunnel looking from right to left in Fig. 3;

Fig. 8 is a fragmentary view similar to Fig. 3 with the latch mechanism in place;

Fig. 9 is a plan view of the carriage for the tunnel, with portions broken away for greater clarity and showing the cassette tray in its initial limit position;

Fig. 10 is a view on a larger scale looking from left to right in Fig. 9 and with the cassette tray in a moved position with respect to Fig. 9;

Fig. 11 is an enlarged section approximately on the line 11—11 of Fig. 9;

Fig. 12 is an enlarged fragmentary view showing the operation of the chain and pickup lug for retracting the carriage;

Fig. 13 is an enlarged detail section on the line 13—13 of Fig. 9;

Fig. 14 is an enlarged fragmentary view showing the operation of the release lever controlling shifting of the cassette tray from its limit position shown in Fig. 9;

Fig. 15 is a somewhat diagrammatic view showing the same parts as Fig. 14 and looking upwards in Fig. 14;

Figs. 16 and 17 are detail assembly views showing the operation of the cam track for causing movement of the carriage to its near exposure position;

Figs. 18 and 19 are views similar to Figs. 16 and 17 showing the operation of the cam track for effecting movement of the carriage to its intermediate exposure position;

Fig. 20 is an enlarged fragmentary section through the indexing cam assembly as indicated by the line 20—20 of Fig. 3;

Fig. 21 is a top view of certain of the parts shown in Fig. 20 and illustrating the operation of the catch for holding the cassette tray in its intermediate position;

Fig. 22 is a detail view of the intermediate position catch shown in Fig. 21;

Fig. 23 is a detail view of one of the indexing cams shown in Fig. 20;

Fig. 24 is a fragmentary view looking downwards in Fig. 20 and showing the cutout switch and its operating cam;

Fig. 25 is an enlarged view of a portion of Fig. 3 showing the operating mechanism for shifting the phototimer tube unit on the tunnel;

Fig. 26 is a section on the line 26—26 of Fig. 25;

Fig. 27 is a section on the line 27—27 of Fig. 26;

Fig. 28 is an enlarged fragment of Fig. 8 showing the latch mechanism;

Fig. 29 is a view looking upwards in Fig. 28;

Fig. 30 is an enlarged fragmentary section on the line 30—30 of Fig. 28;

Fig. 31 is an exploded view of certain of the parts shown in Figs. 28—30; and

Fig. 32 is an enlarged sectional view through the carriage release handle taken on the line 32—32 of Fig. 3.

Referring to the drawings, which illustrate a preferred embodiment of the invention, the main body of the tunnel is a casting 20 of aluminum or other suitable material having bosses 21 at either side for receiving supports (not shown) for mounting the tunnel on a tower attached to an X-ray table. A fluorescent screen 22 is provided in one end portion of the tunnel top, and an opening 23 at the opposite end of the tunnel top provides access to the carriage in the tunnel for loading and unloading cassettes. A boss 24 at one front corner of the table top forms a housing for the usual shutter control levers 25, and a boss 26 at one of the back corners of the body houses the motor drive for the cassette carriage. The tunnel bottom 27 is provided with slotted tracks 28 for receiving the guide and compression cone masks (not shown) which may be of any suitable type.

The cassette carriage assembly is indicated generally at 30 and is shown in detail in Figs. 9–13. At one side of the carriage is a pair of brackets 31 carrying bushings 32 adapted to slide on a shaft 33 mounted within one side of the tunnel body and running the full length thereof. The opposite side of the carriage is provided with a pair of ball bearings 34 or other rollers adapted to ride in a channeled track 35 extending along the opposite side of the tunnel body from shaft 33, and an additional roller 36 at one corner of the carriage rides on one edge of the track 35. The carriage is thus capable of movement lengthwise from a retracted position aligned with the opening 23 to a plurality of selective exposure positions aligned with the fluorescent screen 22.

The cassette carriage 30 is provided with a spring operated drive for advancing it from retracted position to its exposure positions and with a motor operated drive for returning it to retracted position after exposure. The drive spring 40 is secured at one end to a clevis 41 mounted on the front of the carriage, and the other end of this spring is secured to an L-shaped arm 42 pivoted to a bracket 43 on the carriage. The carriage drive rod 44 carries a roller 45 at one end, and its other end is secured to a fork 46 pivoted adjacent the free end of arm 42. The drive rod 44 is mounted for axial reciprocation in a pair of bushings 47 carried by the clevis 41 and a similar clevis 48 also mounted on the front of the carriage.

Driving movement is imparted to the carriage by the spring 40 through one of three selectively used arcuate cam tracks: a stationary track 50 and a pair of movable tracks 51 and 52 mounted in position to be brought selectively into operative relation with the roller 45 on drive rod 44. The stationary track 50 is utilized when it is desired to move the carriage into its farthest forward position in the tunnel, and this track includes a recess 53 at its forward end for receiving the roller 45 when the carriage has reached the limit of its forward movement. The track 51 is utilized when it is desired to shift the carriage into the exposure position nearest the back of the tunnel, and track 51 has a recess 54 similar to the recess 53 for receiving roller 45. The track 52 is employed when the carriage is to be shifted to its intermediate exposure position, and this track has a recess 55 for receiving roller 45. When both of tracks 51 and 52 are retracted, they lie outside the edge of track 50 so that the roller 45 can ride only on track 50, but when either of tracks 51 and 52 is advanced, it will lie inside track 50 and thus receive roller 45 from track 50.

Figs. 3–5, show the operation of one of these tracks, namely the track 51, in driving the carriage. When the carriage is fully retracted, the roller 45 is in the position shown in Fig. 4 so that the spring 40 is fully extended. When the carriage is released, the spring contracts and causes the roller to run down the track towards the middle position shown in Fig. 3. Then after the spring reaches its position of maximum contraction, the carriage continues under its own momentum with resulting restretching of the spring until the roller reaches and seats in the roller 45 as shown in Fig. 5.

The several recesses 53—55 thus act as stops for the carriage in cooperation with the roller 45, and since these parts are located adjacent one of the forward corners of the carriage, additional stop means are provided adjacent the other front corner in order to prevent angular movement of the carriage as it reaches its exposure positions. This stop means comprises primarily a plate 60 fixed to the tunnel body and having three stop shoulders 61, 62 and 63 positioned to be engaged by the forward end of the drive arm 42. As shown, each of these stop shoulders on plate 60 is provided with an adjacent inclined edge portion 65 arranged for engagement with the corresponding inclined end portion 66 on the drive arm 42 as the latter approaches the limit of its forward travel.

This spring drive arrangement for the carriage establishes an effectively harmonic motion for the forward movement of the carriage, which is of material value in providing a rapid advance of the carriage from its retracted position to its exposure positions with minimum shock. Thus the acceleration of the carriage from its stationary start is rapid until it reaches its maximum speed at approximately the midpoint of its forward travel, but during the remaining part of its forward movement, the carriage will be progressively retarded as the energy previously expended by the spring 40 is being restored, so that the carriage will reach and stop at its intended exposure position with minimum shock. Since the carriage is of considerable weight, especially with the cassette and its lead shielding in place, this freedom from shock in spite of the material initial momentum of the carriage is an important advantage in establishing the cassette in position for exposure within a very short interval after the carriage is first released from its retracted position. In fact, with the tunnel constructed as disclosed herein, tests show that the desired exposure can be started as soon as one-half second after the initial release of the carriage.

Return movement of the carriage from all of its exposure positions is effected by the motor 70, which is mounted within the boss portion 26 of the main body and drives a sprocket 71 through a torsion spring 72 (Fig. 6). The sprocket chain 73 extends around the driven sprocket 71 and an idler sprocket 74 at the opposite end of the tunnel, and this chain carries a pair of pickups lugs 75 spaced at equal distances apart along the chain. The lugs 75 cooperate with a pickup spring 77 (Figs. 9 and 12) carried by a bracket 78 on the carriage. These parts are so arranged that when the motor is in operation, the lug 75 engages the end of spring 77 and first displaces the spring until the latter snaps in behind the lug. Thereafter the leading end of the lug engages bracket 78 to carry the carriage back until roller 45 has been moved out of whichever of the recesses 53—55 it is in, and since then the spring 40 would tend to contract and drive the carriage back, the spring 77 catches in the notch in the trailing edge of the pickup lug to prevent the carriage from overrunning the lug. As a result, return movement of the carriage is at a substantially constant speed determined by the speed of the motor, and after the carriage has been returned to its fully retracted position, the pickup lug moves out of engagement with bracket 78 as the chain goes around the drive sprocket 71. Thus since the motor is entirely disconnected from the carriage except during retraction of the carriage, there is no drag on the carriage when it is advancing to an exposure position which might otherwise interfere with the desired smooth and rapid advance as described. Starting and stopping of the motor is effected automatically in properly timed relation with the positioning of the carriage by means of a switch arrangement described hereinafter in connection with the wiring diagram.

Shifting of the cam tracks 51 and 52 is effected through cams forming part of the indexing assembly associated with the indicator knob 80 and its supporting shaft 81 which is journaled in an internal boss portion of the main tunnel body. This indicator knob 80 is shown of light transmitting material such as a suitable plastic, and it carries a series of indicia shown as "0-1-2-3-4-S." The "0" position of the knob corresponds to the locked out position of the carriage following completion of all available exposures. The series of numerals indicates the number of exposures remaining to be taken in a series, and the "S" position of the knob corresponds to the setting for taking a single exposure centered on the cassette. A light such as a neon bulb 82 (Figs. 20 and 24) is mounted within the tunnel body and is aligned with an opening 83 in the body to provide an index mark by illuminating the proper one of the series of indicia on the indicator knob. Indexing of the indicator assembly is effected by an arm 85 pivoted in the body and provided with a biasing spring 86 and a cam roller 87 adapted to be received in the series of notches 88 in the indexing cam 90 on shaft 81.

The cam 90 carries three rollers 91 which operate the shifting assembly for the cam track 51. Referring to Figs. 16 and 17, the track 51 is pivoted in the tunnel body at 95 and is biased in clockwise direction by a spring 96 tending to urge it to its advanced or operative position. Near its other end, track 51 is slotted at 97 to receive a pivoted connection to a bell crank 98 pivoted at 99 to the tunnel body. An elongated link 100 is pivoted at one end to the bell crank 98, and it is pivoted at its other end to a lever 101 pivotally mounted at 102 in the tunnel body. The link 100 is shown as formed in two sections adjustably connected at 103, and it is provided with a spring 105 tending to move it to the left in Figs. 16 and 17 and thus cooperating with spring 96 to urge the track 51 to its advanced position.

The lever 101 is extended beyond its pivot 102 and is formed with a cam edge 110 adapted for engagement with the rollers 91 on cam 90. Thus when the cam 90 is in the position shown in Fig. 16, the cam 110 falls between adjacent rollers 91, and the springs 96 and 105 are thus free to move track 51 to its advanced position. When the cam 90 is indexed to its next position, however, the advancing roller 91 will engage the cam portion 110 of lever 101 and rotate the lever in clockwise direction as viewed in Fig. 17, thus shifting link 100 to the right with resulting retraction of track 51 as shown. This movement of cam 90 is effected automatically upon each return stroke of the carriage to its retracted position, by means of a projecting arm 111 on the carriage which engages the series of pins 112 which project on the opposite side of cam 90 from the rollers 91.

The shifting mechanism for the track 52 is similar to that of track 51. Referring to Figs. 18 and 19, track 52 is pivoted in the tunnel body at 95 and is provided with a spring 116 similar to spring 96. The opposite end of track 52 is slotted at 117 to receive a pivotal connection to the bell crank 118 which is pivoted at 119 to the tunnel. An elongated link 120 is pivoted at one end to the bell crank 118 and at its other end to a lever 121 pivoted at 122 in the tunnel. The link 120 is shown as formed in two parts adjustably connected at 123, and it is provided with a spring 125 arranged similarly to the spring 105 for cooperation with spring 116 to urge the shifting assembly in the direction to move track 52 to its advanced position shown in Fig. 18.

Track 52 is normally held in its retracted position by means of a cam 130 mounted on the shaft 81 and having a largely circular periphery formed with a single notch 131 for receiving the roller 132 on the extended end portion of lever 121. The notch 131 corresponds to the "S" setting of knob 80, so that when the knob is in this position, cam follower 132 is received in notch 131 and permits the spring to shift track 52 to its advanced position. In all other settings of the knob, the follower 132 will slide on the outer or curved portion of cam 130 so that the shifting mechanism will operate to hold track 52 in its retracted position shown in Fig. 19.

The cassette carriage 30 includes a tray 140 which receives the cassette and is mounted for shifting movement in the carriage between two limit positions employed for taking four pictures on a single film and an intermediate position which is employed for taking either two pictures each covering half the film or a single picture centered on the film. At one end of the tray is a flange 141 cooperating with the bottom of the tray to form a small channel for receiving the end of the cassette, and a spring 142 is mounted within the channel on a stud 143 to form a resilient holder for the cassette. At the opposite end of the tray is the cassette ejector which comprises a lever 145 pivoted on the end wall of the tray and provided with a torsion spring 146 (Fig. 13) normally holding it in retracted position. The finger portion 147 of the lever 145 extends through a slot in the end wall of the tray and normally lies in a groove in the bottom of the tray below the cassette, so that when the handle portion 148 of the lever is depressed, the finger 147 will rise and lift the end of the cassette sufficiently to be readily grasped by the hand of the operator.

The cassette tray 140 slides within the carriage 30 and is urged therein downwardly as viewed in Fig. 9 by a pair of springs 150 and 151. The spring 150 is anchored at one end to a bracket 152 on the carriage, and its other end is secured to a stud 153 projecting from the tray through a slot in the side wall of the carriage. The spring 151 forms a part of an air check assembly indicated generally at 155 for checking the shifting movement of the tray, and one end of spring 151 is anchored with respect to the carriage on a bracket 156. The other end of the spring is secured to the outer end of a rod 160 which carries at its inner end the piston for a dash pot cylinder 161 mounted on the side of the carriage. The rod 160 is anchored by a set screw 163 in a block 164 bolted to the side wall of the cassette tray and extending through a slot in the side wall of the carriage. Thus movement of the tray upwards in the carriage as viewed in Fig. 9 will extend spring 151 through its fixed connection with the tray formed by the rod 160, set screw 163 and block 164, and the spring 150 will similarly be extended through its fixed connection to the tray provided by the stud 163. The air check assembly 155 also carries the latch member 165 which cooperates with the latch assembly 166 in the tunnel body as described hereinafter.

Selectively operable catches are provided for holding the cassette tray in either the extreme uppermost portion as viewed in Fig. 9 or its intermediate position, with the other limit position being at the lower end of the carriage as viewed in Fig. 9, in which position this tray abuts a bumper 170. The catch for holding the carriage in its other limit position comprises a Z-shaped rod 171 (Fig. 11) extending laterally across the end of the carriage and including a hub portion mounted for rocking movement on the stud 143. One end 172 of rod 171 is turned up to form an actuating arm for the rod, and the other end 173 is turned down and extends through a hole in a pad 174 on the bottom of the tray for movement into and out of engagement with a complementary hole 175 in the adjacent corner portion in the bottom of the carriage. Leaf spring 176 normally urges rod 171 in clockwise direction as viewed in Fig. 11, and thus urges the rod end 173 normally into its locking position.

Referring to Figs. 9, 21 and 22, the lock for holding the cassette tray in its intermediate position comprises a generally bellcrank shaped latch 180 pivoted at 181 on the bottom of the carriage. One end of the latch 180 extends outwardly at an angle from the carriage, and its other end is adapted to latch with the complementary keeper 182 on the bottom of the tray. A leaf spring 183 normally urges the latch 180 into latched relation with its keeper, and both the latch and keeper have beveled cam faces 185 which cooperate when the tray is moved upwards as viewed in Fig. 9 first to move the latch out of the way and then to snap in behind the keeper.

In the normal use of this tunnel for taking four consecutive pictures, the cassette tray is in its uppermost position in the carriage as viewed in Fig. 9 for the first and second pictures and then shifts to the lowermost position for the third and fourth pictures. This shift is effected automatically through release of the latch rod 171 as the carriage begins to retract following the second exposure. This operation of the latch rod is effected by the release lever 190 which is pivoted at 191 in one forward corner of the tunnel body and is normally urged in clockwise direction as viewed in Fig. 14 by a spring 192 and against a stop 193.

For the first of a series of four pictures the carriage travels only to the nearest position determined by the cam track 51, and the latch rod does not reach the release lever 190. For the second picture, however, the carriage travels to the far end of the tunnel, and during this movement, the latch rod end 172 engages and swings the release lever 190 out of its way, after which the lever snaps in behind lever end 172. The lever 190 has an inclined cam face 195, and when the carriage begins to retract after the second exposure, the latch rod end 172 rides up this cam face and is thereby forced to tilt with resulting withdrawal of the other end 173 of the latch rod from its keeper hole 175 in the bottom of the carriage. This release of the latch rod 171 takes place after the carriage has begun to retract in the tunnel, and in order to prevent too rapid initial movement in the tray with possible resulting shock, means are provided for restraining shifting movement of the tray.

Referring to Figs. 3 and 10, a plate 200 is mounted on the tunnel body and is provided with an upturned inclined flange 201 along its inner edge. The bottom of the carriage carries a roller 202 on an extended stud 203, and this roller is positioned to ride on the inner surface of flange 201 as the carriage is moving in the tunnel. The flange terminates short of the end of plate 200 so that as the carriage nears its fully retracted position, the roller 202 is freed to permit the tray to complete its shifting movement. Thus in addition to the cushioning provided by the air check assembly, the flange 201 provides a retarding action on the tray during the section of its travel when the springs 150 and 151 are contracting from their positions of maximum expansion, thereby preventing unduly fast movement of the tray with resulting possibilities of shock to the cassette and other parts.

The latch 180 operates to hold the tray in its intermediate position in the carriage which is utilized only when taking either a single picture centered on the cassette or two pictures each occupying one-half of the cassette. It is therefore necessary to hold latch 180 out of its operative position when the tray is shifting between its two limit positions during the taking of four pictures. This is accomplished by a cam lever assembly operated by the indicator knob 80.

Referring to Figs. 3, 20 and 21, a lever 205 is mounted for sliding movement on a guiding pin 206 set in the tunnel body. The lever 205 includes a cam portion 207 adapted to be positioned in the path of the outwardly extending portion of latch 180, and a spring 208 urges cam lever 205 towards the left in Figs. 20 and 21 to its limit position in which its cam portion 207 is in the path of latch 180. Shifting of cam lever 205 to its other limit position is effected by a bellcrank 210 pivoted in the tunnel at 211 and pivoted to cam lever 205 at 212. A roller 213 on the bellcrank forms a cam follower for an arcuate cam 215 on the face of cam 130, and the cam 215 is arranged in predetermined relation with the cam notch 131 so that it is in engagement with cam follower 213 except when the indicator knob is in its "4" and "3" settings. At such settings of the indicator knob, the cam lever 205 will be drawn into its position such that the cam portion 207 thereon will be engaged by latch 180 as the carriage retracts, as shown in Fig. 21, so that the latch 180 is released to permit full travel of the cassette tray from one end of the carriage to the other.

Whenever the indicator knob 80 is in any of its other settings, the cam lever 205 will be shifted by contact of roller 213 with cam 215 to its limit position wherein its cam portion 207 will be out of the way of latch 180, thereby leaving the latch in proper position to hold the cassette tray centered in its intermediate position in the carriage. If movement of the knob to any of these positions takes place automatically as described during the sequence of four pictures, it will result in holding latch 180 in operative position after the tray has already shifted to its other limited position. If, however, the knob is manually shifted to any of these positions when the tray is in its upper position as viewed in Fig. 9, it is necessary to release latch rod 171 in order to shift the tray to its intermediate position. This release is effected by means of a heel bar 216 (Figs. 1 and 3) which projects through the top of the tunnel body and is positioned to overlie the end portion 172 of latch rod 171 in the fully retracted position of the carriage. A flat spring 217 normally holds heel bar 216 in its raised position, and when the heel bar is depressed against this spring, it causes latch rod 171 to rock sufficiently to release its locking end portion 173 and thus permit the tray to shift in the carriage until it is stopped by engagement of keeper 182 with latch 180.

In addition to the cam 215, the cam 130 carries a single cam roller 220 which is so positioned thereon that in the "0" setting of the indicator knob, this cam roller will engage the operating button 221 of the cutout switch 222 which is mounted in the tunnel body below light bulb 82 and is the safety switch effective to open on the operating circuits to the tunnel, as described in detail hereinafter in the wiring diagram. The cam 90 also carries a single projecting cam pin 225 which is so positioned that in the "0" setting of the indicator knob, it will interfere with release of the latch assembly 166 controlling advance of the carriage from its retracted position, as now described.

The main member of latch assembly 166 is the latch 230 pivoted at 231 on a plate 232 which forms the latch body, and latch 230 is normally biased to locking position by a spring 233 attached at opposite ends to a flange 234 on plate 232 and a screw or pin on the latch. The latch assembly is supported on a block 235 bolted to the tunnel body, and the latch plate 232 is pivoted on block 235 by a stud 236 journaled in the block and threaded in plate 232. Two spacer plates 237 and 238 are also pivoted on stud 236, and movement of these parts with respect to plate 232 is limited by a shouldered screw 240 set in the plate and extending through slots 241 and 242 in the spacer plates 237 and 238 respectively. A lever 245 is secured to the opposite end of the stud 236 from plate 232.

A spring 247 is attached to a pin 248 on the plate 237 and to the link 100. A spring 250 is attached to the tunnel body and to the flange 251 on plate 232 and acts to pull the plate in the direction to hold latch 230 closed. An additional spring 252 is attached to the tunnel body and to a pin 253 on plate 238 and acts to pull the latter in the opposite direction from the other springs towards a limit position established by a stop bolt 254 in the tunnel body. A cable 255 is connected with plate 237 by a spring 256, and this cable is guided around the tunnel by pulleys 257 to the release lever 260 on the sleeve 261 which forms the mounting shaft for the carriage release handle 262 outside the tunnel. A spring 263 is connected between lever 260 and the tunnel for cooperation with spring 256 to maintain the handle and release lever normally in their centered neutral position. Stops 264 and 265 limit movement of lever 262 in each direction from its neutral position.

The latch assembly is so constructed and arranged that once it has been released to permit the carriage to travel forwardly in the tunnel, it will not again release the carriage until it has been recocked by return of the handle 262 to past its neutral position. This result is effected by cooperative action of the plates 232 and 238, which are selectively clutched to plate 237 by means of a ball 270 which engages in a bore 271 in plate 237 and additional bores 272 and 273 in the plates 232 and 238. The bores 272 and 273 are sufficiently smaller in diameter than ball 270 to prevent passage of the ball therethrough, but at the same time either of bores 272 and 273 will receive a sufficient amount of the ball therewithin to provide for complete disengagement of the ball from the other of this pair of small bores.

In the normal position of the parts with the device at rest, the several springs maintain the latch 230 in engagement with its complementary latch member 165 on the carriage. At the same time, the action of these springs will cause the ball 270 to engage in the bores 271 and 273, thus clutching plates 232 and 237 together and releasing plate 238. When the cable 255 is pulled by lever 260, it draws the clutch plates 237 and 232 in the direction to cause the latch member to disengage and thereby to release the carriage. This movement of the latch members, however, brings the ball 272 back into alignment with bore 273 in plate 230, and as soon as this occurs, the tension of spring 250 on plate 232 will cause the ball to be cammed out of bore 272 into bore 273, thus clutching plates 237 and 238 together and releasing plate 232 for movement back to its normally closed position.

If now the handle 262 is held in released position and the carriage retracts, the latch members 230 and 165 reengage but after this happens, they will not again release so long as the handle is held in released position, because the spring 250 will hold latch member 230 in latched position. In order again to release the carriage, the handle must be returned to or past its neutral position. This movement of the handle will permit plates 237 and 238 to move against spring 252, because spring 247 is a substantially stronger spring, until the ball 270 is again aligned with all three bores. As soon as this occurs, the action of spring 252 will cause the ball to be cammed back out of bore 273 into bore 272, whereupon plate 238 will return to its normal rest position. This completes recocking of the latch assembly so that when thereafter handle 262 is again removed to its release position, the latch will release.

The latch assembly can be recocked and released in any position of the indicator knob 80 except when the knob is at its "0" setting. At this setting, as previously noted, the safety switch 222 is opened so that all operating circuits to the tunnel are broken. In addition, when the knob is in its "0" setting, the pin 225 on cam 90 will engage behind the lever 245 on the stud 236, thus positively locking the latch against release irrespective of whether it has been recocked.

The handle 262 also operates in timed relation with the movements of the carriage to shift into and out of operative position, the phototube unit 280 for controlling photoelectric timing apparatus of the type now commonly used in radiography and disclosed in patents such as Morgan et al. 2,401,288 and 2,401,289. Referring to Figs. 25–27, the phototimer tube unit includes a boss 281, and it is mounted on top of the tunnel on a shaft journaled in a bearing 283 which is bolted to the tunnel body and includes a segment portion 284 which projects into a generally cylindrical opening 285 within the boss 281. A torsion spring 286 is arranged to bias the unit 280 from its retracted position shown in Fig. 1 to its operative position aligned with the center of the fluorescent screen 22. A pin 287 and a rubber bumper 288 within recess 285 cooperate with the opposite sides of the segment portion 284 to establish the limit positions of the unit.

The inner end of shaft 282 is secured to a crank 290 connected by an elongated link 291 with a bellcrank 292 pivoted in the body at 293. An arm 295 is slotted at 296 for pivotal attachment to bellcrank 292, and the other end of this arm is pivoted to lever 260. A catch lever 297 is pivoted in the housing at 298 and includes a shoulder 299 adapted for engagement with a complementary catch portion on the bellcrank 292. A torsion spring 300 on a retainer spool 301 normally urges the catch lever 297 into latching engagement with the bellcrank. The free end of catch lever 297 extends above arm 295 and is adapted to be engaged by a turned-up tongue 303 on this arm.

Fig. 25 shows the position of the parts when the handle 262 is in neutral position. When the handle is rotated to release the carriage as previously described, movement of lever 260 will pull arm 295 in the direction to cause its tongue portion 303 to move catch lever 297 out of engagement with the bellcrank 292. As soon as bellcrank 292 is released, the torsion spring 286 will swing the phototube out to its operative position. Return movement of the phototube unit is effected by the return movement of handle 262 past its neutral position. This will cause arm 260 to rotate bellcrank 292 in the direction to retract the phototube unit through crank 290. As soon as the bellcrank has rotated sufficiently to permit reengagement of its catch portion with shoulder 299, the parts will interlock and remain in the position shown in Fig. 25 until the handle 262 is again released.

In addition to its other functions, the handle 262 supports the operating plunger 309 for a push button type of exposure switch 310 (Figs. 3 and 32) mounted within the tunnel on a bracket 311. The plunger 309 extends through the sleeve 261 and is provided with a spring 312 normally holding it in raised position. At its inner end, the plunger 309 carries a conical cam 313 adapted to engage the operating button of switch 310 when the plunger is depressed. The exposure switch 310 may be used alternatively with a foot switch of any suitable type as indicated at 315 in the wiring diagram.

A change-over switch 320 (Fig. 3) is provided for changing the circuits to the X-ray tube from fluoroscopic to radiographic intensity in timed relation with the movements of the carriage between its retracted and exposure positions. The switch 320 is mounted on a bracket 321 at the opposite back corner of the tunnel body from the motor 70, and its operating button is adapted to be engaged by an arm 323 extending outwardly from the carriage. Thus when the carriage is in fully retracted position, the arm 323 engages the switch button and holds the switch in its open position in which the tube circuits (not shown) supply current to the tube for the proper fluoroscopic intensity. As soon as the carriage is released and moves away from its retracted position towards the exposure position, the switch button is released to cause the switch 320 to close and thus to complete the actuating circuit to the tube circuits for raising the tube intensity to the proper radiographic level.

The sequential operation of the tunnel will be more readily apparent from the wiring diagram in Fig. 2, in which one power line is identified as $L_1$ and the connections to the other power line are indicated at $L_2$. The diagram shows the relevant positions of the several switches and relays when the carriage is in its retracted position, it being understood that the relays may be housed in any suitably located control box and do not need to be within the tunnel itself. As previously noted, the cutout safety switch 222 is closed by movement of the indicator knob 80 away from its "0" position, whereupon the neon bulb 82 will light. The first step in taking a radiograph is to release the latch assembly 166 by movement of handle 262 as described, and as soon as the carriage begins to move, the change-over switch 320 will close to send the proper signal to the X-ray tube controls as indicated by line 330. At the same time, the phototube unit will switch into operative position as previously described.

As soon as the carriage arrives in its selected advanced position, which is within approximately one-half second, the exposure may be started by closing either the push button switch 310 or the foot switch 315. Closing of either of these switches completes an energizing circuit for the operating coil 331 of relay $R_1$ through the back contacts of relay $R_3$. Closing of relay $R_1$ completes the energizing circuit for the coil 332 of a relay $R_2$ and also completes the circuit to the exposure timer mechanism, as indicated by the line 333. In addition, closing of relay $R_2$ completes a holding circuit for its coil 332 through its lower pair of contacts and the line 334.

The exposure thus started continues for the interval determined by the controlling timer mechanism, and thereafter the condition of the circuits shown in Fig. 2 remains as described until the operator releases the previously closed exposure switch 310 or 315. As soon as this occurs, relay $R_1$ opens, but immediately thereafter the operating coil 335 of relay $R_3$ is energized through the upper pair of contacts of relay $R_2$ and the back contacts of relay $R_1$. Closing of relay $R_3$ completes the energizing circuit for the coil 336 of a relay $R_4$ which controls the motor 70, which is shown as having a field coil 337 and armature 338, and the motor accordingly is started to retract the carriage as previously described. The motor continues to operate until the carriage is fully retracted and opens switch 320, causing successive opening of relays $R_2$, $R_3$ and $R_4$ in that order. Also as shown in Fig. 2, the wiring for motor 70 is such that when relay $R_4$ is deenergized, the current is fed back into the motor 70 in the reverse direction to provide dynamic braking and thus immediately to stop the motor.

If it is desired to return the carriage from an exposure position without taking a picture, this may be accomplished by means of a push button switch 340 located at the front end of the carriage and operating as shown in Fig. 2 to short circuit the relay $R_1$ and to energize relay $R_2$ directly in order to start motor 70 as described. Fig. 1 also shows a toggle switch 343 mounted on the tunnel body which may be employed in conjunction with a tilting X-ray table to control the motor for tilting the table.

It will accordingly be seen that operation of this tunnel is simple and automatic, with the carriage being advanced to its exposure position by simple release of the control handle, and with its retraction being similarly effected automatically by the motor 70 as soon as the motor switch is released. For single pictures occupying the entire film area, the indicator knob is turned to its "S" setting, and the operator can take as many such pictures as he wishes provided the cassette is changed after each exposure. In taking each such picture the cassette tray is held in its intermediate position in the carriage, and the track 52 is proportioned so that its stop recess 55 will locate the carriage with the cassette centered in the path of the X-ray beam.

If the indicator knob 80 is initially set to take four pictures, the carriage will move alternately to its near and far exposure positions, and the cassette tray will shift from one limit position to the other between the second and third exposures. Upon completion of the fourth exposure, the tunnel will be locked out against further use, by operation of both switch 222 and the pin 225. If it is desired to take only two pictures each occupying half the film area, it is merely necessary to turn the control knob to its "2" setting and operate the heel bar 216, and thereafter the carriage will move first to its near position, then to its far position, and then lock out. In these two exposure positions, the desired half areas of the cassette will be progressively centered in the path of the X-ray beam by the action of the tracks 50 and 51. Similarly, in taking four exposures, the shifting of the cassette tray as described will successively center the quadrants of the cassette on the beam for desired uniformity of exposure conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A spot film tunnel comprising a tunnel body, a carriage mounted for movement in said tunnel body from a retracted position to an advanced exposure position, means in said carriage for receiving and holding X-ray sensitive means, a curved track arranged generally longitudinally of said body, a follower for said track, means supporting said track and said follower one on said body and the other on said carriage, yieldable means pressing said follower and track together laterally of said tunnel body to cause relative travel of said track and said follower with resulting substantially harmonic motion of said carriage in said body, means adjacent one end of said track for receiving and holding said follower to stop said carriage in said exposure position, and means for retracting said carriage to said retracted position.

2. A spot film tunnel comprising a tunnel body, a carriage mounted for movement in said tunnel body from a retracted position to an advanced exposure position, means in said carriage for receiving and holding X-ray sensitive means, a track mounted in said body and presenting a concave track surface arranged generally longitudinally of said body, an arm pivoted on said carriage, a roller on said arm adapted to ride on said track surface, a spring positioned on said carriage to exert pressure on said arm and said roller against said track causing said roller to travel on said track with resulting substantially harmonic motion of said carriage from one end of said track to the other, said track having a pocket therein adapted to receive and hold said roller to stop said carriage in said exposure position, and means for retracting said carriage to said retracted position.

3. A spot film tunnel comprising a tunnel body, a carriage mounted for movement in said tunnel body and adapted to receive and hold X-ray sensitive means, means including a plurality of curved tracks in said body establishing a plurality of advanced exposure positions for said carriage, follower means on said carriage adapted to ride on said tracks, selectively operable means for shifting said tracks into and out of engagement with said follower means to select a single said track, yieldable means on said carriage adapted to exert pressure on said follower means against said selected track to cause said follower means to travel on said track with resulting substantially harmonic motion of said carriage from said retracted position to an exposure position corresponding with said selected track, means for retaining said carriage in said exposure position, and means for retracting said carriage to said retracted position.

4. A spot film tunnel comprising a tunnel body, a carriage mounted for movement in said tunnel body from a retracted position at the rear end of said body to the forward end of said body, means in said carriage for receiving and holding X-ray sensitive means, a curved track fixed in said body and arranged generally longitudinally thereof, a roller on said carriage adapted to ride on said track, yieldable means pressing said roller against said track to cause said roller to travel on said track with resulting substantially harmonic motion of said carriage from one end of the track to the other, means at the forward end of said track for receiving and holding said roller to stop said carriage in an exposure position, an additional pair of tracks curved about different radii shorter than said fixed track and mounted for shifting movement in said body into and out of engagement with said roller, each one of said pair of tracks having means at the forward end thereof for receiving and holding said roller to stop said carriage in other exposure positions, means for selectively shifting said shifting tracks into and out of engagement with said roller to select the exposure position to which said carriage is to advance, and means for retracting said carriage to said retracted position.

5. A spot film tunnel comprising a tunnel body, a carriage mounted for movement in said tunnel body from a retracted position to an advanced exposure position, means in said carriage for receiving and holding X-ray sensitive means, spring means for moving said carriage from said retracted position to said exposure position, means for initiating exposure of said sensitive means when said carriage is in said exposure position, power operated drive means in said tunnel body for retracting said carriage to said retracted position, means for connecting said carriage with said drive means for retraction thereby, means normally maintaining said connecting means unconnected to prevent drag by said drive means on said carriage during advancing thereof, means responsive to completion of said exposure for actuating said drive means, and means responsive to actuation of said drive means for causing connection of said connecting means to effect retraction of said carriage.

6. A spot film tunnel comprising a tunnel body, a carriage mounted for movement in said tunnel body from a retracted position to an advanced exposure position, means in said carriage for receiving and holding X-ray sensitive means, means for retaining said carriage in said retracted position, means for releasing said retaining means, means including a spring in said body for advancing said carriage to said exposure position in response to the release of said retaining means, a motor in said body for retracting said carriage from said exposure position against said spring, means for effecting exposure of said sensitive means following movement of said carriage to said exposure position, means responsive to completion of said exposure for automatically actuating said motor, and means operable alternatively with said exposure effecting means for actuating said motor.

References Cited in the file of this patent

UNITED STATES PATENTS

| | | |
|---|---|---|
| 2,026,907 | Morrison | Jan. 7, 1936 |
| 2,184,962 | Scholz | Dec. 26, 1939 |
| 2,327,603 | Kizaur | Aug. 24, 1943 |
| 2,332,044 | Bell | Oct. 19, 1943 |
| 2,468,381 | Sussin | Apr. 26, 1949 |
| 2,552,858 | Mueller et al. | May 15, 1951 |
| 2,567,566 | Kazaur | Sept. 11, 1951 |
| 2,668,913 | Goldfield et al. | Feb. 9, 1954 |